United States Patent [19]

Lutes

[11] Patent Number: 4,893,890

[45] Date of Patent: Jan. 16, 1990

[54] LOW-LOSS, HIGH-ISOLATION, FIBER-OPTIC ISOLATOR

[76] Inventor: George F. Lutes, 3509 Stancrest Dr., Glendale, Calif. 91208

[21] Appl. No.: 190,185

[22] Filed: May 4, 1988

[51] Int. Cl.[4] .......................... G02B 6/32; G02B 5/30; G02F 1/00

[52] U.S. Cl. .................................. 350/96.18; 350/375; 350/378

[58] Field of Search .................. 350/96.13, 96.18, 375, 350/376, 377, 378, 401, 403

[56] References Cited

U.S. PATENT DOCUMENTS

| | | | |
|---|---|---|---|
| 4,178,073 | 12/1979 | Uchida et al | 350/375 |
| 4,239,329 | 12/1980 | Matsumoto | 350/96.15 |
| 4,268,112 | 5/1981 | Peterson | 350/96.18 |
| 4,375,910 | 3/1983 | Seki | 350/375 |
| 4,420,219 | 12/1983 | Muchel | 350/96.18 |
| 4,548,478 | 10/1985 | Shirasaki | 350/377 |
| 4,635,246 | 1/1987 | Taylor et al. | 370/3 |
| 4,671,621 | 6/1987 | Dillon, Jr. et al. | 350/403 |
| 4,712,880 | 12/1987 | Shirasaki | 350/405 |
| 4,756,607 | 7/1988 | Watanabe et al. | 350/375 |

FOREIGN PATENT DOCUMENTS

| | | | |
|---|---|---|---|
| 0130934 | 7/1985 | Japan | 350/375 |
| 0222818 | 11/1985 | Japan | 350/375 |

OTHER PUBLICATIONS

Shirasaki et al., "Compact Optical Isolator for Fibers Using Birefringent Wedges", Applied Optics, vol. 21, no. 23, 1982, pp. 4296–4299.

Matsumoto, "Polarization-Independent Isolators for Fiber Optics", Electronics and Communications in Japan, vol. 62-C, No. 7, 1979 pp. 113-118.

Carroll, James P., Messbauer, Frederick B., Whitfield, Charles H., Design Considerations of the Expanded Beam Lamdek Single-Mode Connector, Lamdek Fiber Optics, A Division of Eastman Kodak Co., presented at FOC/LAN 85, San Francisco, Calif., Sep. 1985.

*Primary Examiner*—Rodney B. Bovernick
*Assistant Examiner*—R. D. Shafer

[57] ABSTRACT

A low-loss, high-isolation, fiber-optic isolator for use in single-mode fiber systems utilizes a Faraday rotator and two polarizers, one at each end angularly oriented from each other at the angle of rotation for isolation, and two aspheric lens connectors to couple optical fibers to the Faraday isolator to reduce forward loss to about 2.6 dB and improve isolation to greater than 70 db.

5 Claims, 2 Drawing Sheets

LOW-LOSS, HIGH-ISOLATION, FIBER-OPTIC ISOLATOR

ORIGIN OF THE INVENTION

The invention described herein was made in the performance of work under a NASA contract, and is subject to the provisions of Public Law 96-517 (35 USC 202) in which the Contractor has elected not to retain title.

1. Technical Field

The invention relates to a low-loss, high-isolation, fiber-optic isolator for use in single-mode fiber systems, and more particularly to an isolator having a measured forward loss of 2.6 dB and improved isolation to greater than 70 dB.

2. Background Art

Reflections cause intolerable instabilities in fiber-optic systems used in some precision applications, such as precise reference frequency distribution and microwave transmission. The reflections have the same effect on a semiconductor laser source as an unstable external cavity, and causes changes in the laser's output wavelength and amplitude. In some systems, external reflections must be reduced by 60 dB or more before the resulting instabilities are reduced to tolerable levels.

Optical isolators are currently used to alleviate this problem. However, the best single-mode fiber-optic isolators which have been reported have losses of 3 or 4 dB and isolation of 30 to 40 dB. (See Okamoto, K., Miyazawa, H., Noda, J., and Saruwatari, M., "Novel optical isolator consisting of a YIG spherical lens and PANDA-fiber polarizers," Elect. Lett., 1985, 21, pp. 36–38; Green, A. E., Georgiou, G., "Compact bulk optical isolator with monomode fibre pigtails for use at 1.3," Elect. Lett., 1986, 22, pp. 1045–1046; and Gauthier, D. J., Narum P., Boyd, R. W., "Simple, compact, high-performance permanent-magnet Faraday isolator," Optics Lett., 1986, 11, pp. 623–625. It is necessary to use two such isolators in series to obtain the isolation of greater than 60 db required in some fiber-optic systems, such as those used for precise reference frequency or microwave frequency distribution.

There are disadvantages in using two isolators in series: good optical isolators are very expensive, and the forward loss is increased.

Statement of the Invention

Accordingly, it is an object of this invention to provide an optical isolator with greater than 70 dB isolation of reflected light from a source and less than 3 dB loss in the forward direction.

The low-loss and high-isolation apparatus of this invention is comprised of an isolator assembly consisting of a Faraday rotator and polarizers on each side oriented with respect to each other at an optimum angle between their directions of polarization equal to the rotation angle of the rotator, and two aspheric lenses facing each other, one on each side of the isolator assembly.

Each of the aspheric lenses has an aspheric surface facing the isolator assembly and a planar surface on the outside. Together with the isolator assembly positioned in a gap of several centimeters between the aspheric lens, the aspheric lenses permit light to be transmitted with low loss and high isolation from one side to the other by accepting incident light through small apertures and expanding the light to collimated beams larger than the apertures, and providing a small acceptance angle and small aperture to reflected light within the isolator assembly.

The novel features that are considered characteristic of this invention are set forth with particularity in the appended claims. The invention will best be understood from the following description when read in connection with the accompanying drawings.

DETAILED DESCRIPTION OF THE INVENTION

Figure 1:
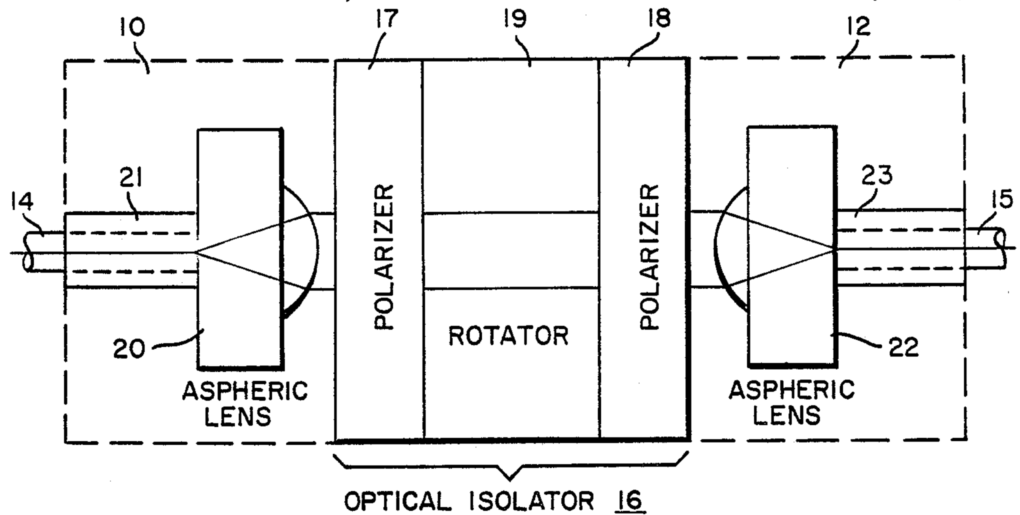
FIG. 1 is a schematic block diagram of the present invention.

FIG. 1 is a schematic drawing of the invention comprised of two connectors 10 and 12 for optically coupling to the ends of single-mode optical fibers 14 and 15. Positioned between the connectors is an optical isolator 16 comprised of two polarizers 17 and 18 oriented at an optimum angle $\alpha$ from each other, depending on the angle of rotation of a transparent isotropic medium 19 having a Verdet constant $\omega$ in a magnetic field of strength H. The angle $\alpha$ of rotation is equal to $\alpha = wlH$, where l is the length of the path traversed through the medium. The connectors 10 and 12 consist of aspheric lenses 20 and 22, and ferrules 21 and 23 on flat sides opposite the aspheric surfaces. The flat surfaces are oriented parallel to planar surfaces of the isolator 16 in order to align the axes of the lenses parallel to each other and with minimum lateral offset from each other.

The organization of the low-loss, high-resolution, single-mode fiber-optic isolator shown in FIG. 1 will now be described in terms of the functions of the components. The isolator 16 is essentially generic and is the primary means for isolation between the fibers 14 and 15. The isolator used in this assembly is a model IO-4-IR manufactured by Optics For Research, Box 82, Caldwell, N.J. 07006, who manufactures a variety of optical isolators using the Faraday rotator principle. The model used is designed for 1300 nm operation and has an aperture of 4 mm. Isolation is specified as greater than 30 dB. One better than about 40 dB has not heretofore been known. Forward loss is specified to be less than 0.5 dB.

Figure 2:
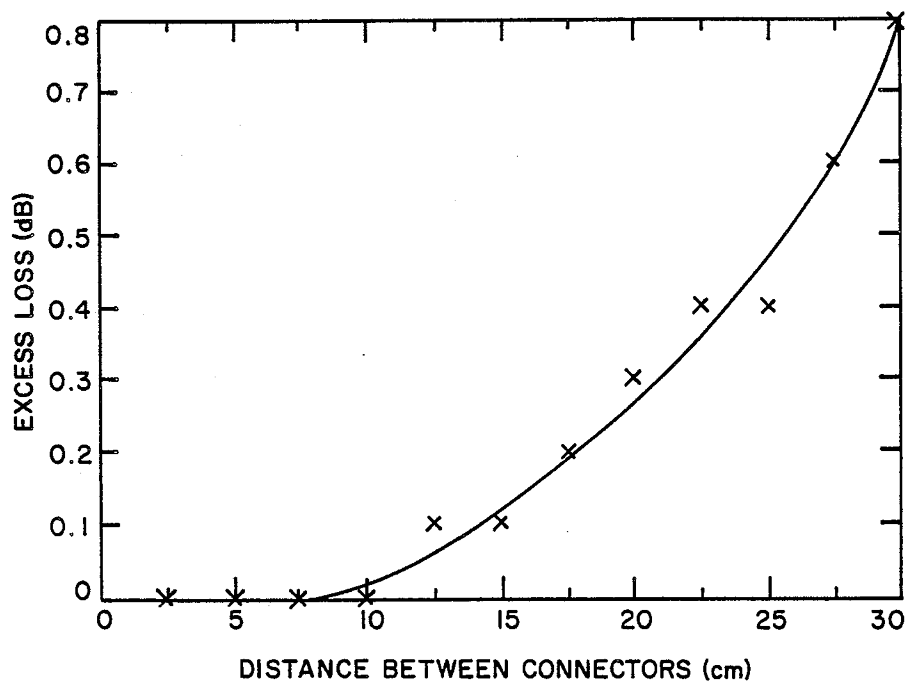
FIG. 2 is a graph of excess transmission loss (dB) as a function of distance between aspheric lens connectors (cm).

As noted hereinbefore, such an isolator is not sufficient. Two such isolators in series would normally be required for isolation greater than 60 dB, but forward loss is then apt to be greater than 3 dB. Accordingly, only one such isolator is used with the connectors 10 and 12 facing each other one on each end of the isolator. These connectors permit light to be transmitted with low loss from the single-mode optical fiber 14 to the single-mode optical fiber 15 with a gap of several centimeters between them. A plot of the optical loss as a function of the distance between connectors is shown in FIG. 2. The connectors are placed an appropriate distance for the optical isolator to be installed between them.

The aspheric lenses 20 and 22 are shaped to convert a beam entering through a small aperture (diameter of the optical fiber) into a larger columnar beam, and are provided with ferrules 21 and 23. These aspheric lenses with ferrules attached are commercially available from Lamdek Fiber Optics, a division of Eastman Kodak Company. The lenses are made of glass to facilitate mass production, to render them capable of excellent performance over a broad range of environmental conditions (temperature, humidity, etc.), and to provide long life operation (20 years). Flat surfaces are provided around the aspheric surfaces of the lenses 20 and 22 which are parallel to their planar surfaces in order to facilitate aligning the axes of the two connectors to within less than 15 seconds of arc. Means (not shown) are provided to maintain the connector and isolator assemblies together, and in alignment with the isolator. Such means may include precision steel balls between the surrounding flat surfaces of the lenses and the planar surfaces of the isolator, as suggested by Lamdek Fiber Optics. The isolator surfaces should also be aligned perpendicular to the connector axes with the same degree of accuracy. Once aligned angularly, the axis of one connector through the isolator assembly relative to the axis of the other connector should be adjusted for a minimum of lateral displacement, within 0.05 mm lateral displacement. This angular and lateral alignment is important because the function of the connectors 10 and 12 is to virtually eliminate internal reflections by providing the small apertures and acceptance angles needed for high isolation by the Lamdek connectors.

Each aspheric lens is ideally provided with an aspheric surface that is an ellipse of revolution with a conic constant $K=1/N^2$, where N is the index of refraction of the lens material (glass) to eliminate spherical aberration in the beam entering the connector 10 as it is transmitted through the connector 12. Aspheric lenses are reported by the manufacturer to eliminate over 0.4 dB insertion loss, as compared to spherical lenses. They are used in the present invention in order to transmit a substantially collimated 1.5 mm beam through the isolator 16, and then to refocus the beam to a small aperture (9 $\mu$m diameter) of the fiber 15. As the beam enters the isolator 16, it is polarized in a particular direction. That direction is then rotated through an angle $\alpha$ by the rotator 19, and the rotated and collimated beam is then passed through the polarizer 18 having its direction of polarization oriented at the angle $\alpha$ in respect to the polarization direction of the polarizer 17. The connectors 10 and 12 virtually eliminate all scattered reflections at the ends of the fibers 14 and 15 by providing a small aperture at their interfaces with the planar back of the aspheric lenses.

The theory of operation of the low-loss, high-isolation, fiber-optic apparatus of FIG. 1 will now be further described, but first it should be recalled from the discussion of the background art that reflections cause instabilities in fiber-optic systems which are intolerable in some precision applications, such as precise reference frequency distributions and microwave transmission. Reflections have the same effect on a semiconductor laser source as an unstable external cavity, and causes changes in the laser's output wavelength and amplitude. In some systems, external reflections must be reduced by 60 dB or more before the resulting instabilities are reduced to tolerable levels.

The isolator 16 has much greater isolation potential than expected. However, the isolation reported previously by the manufacturer of the isolator 16 was evidently limited by scattering due to internal reflections. The polarization of this scattered light at various locations within the isolator 16 is not in the direction required for high attenuation. Consequently, such scattered light was a problem in achieving the full potential of the isolator. A secondary problem is the nonuniformity of the polarizers across their diameters. The polarizers have a much higher extinction ratio when the optical beam size is smaller because they are more uniform across a small area.

Fortunately the scattered light, which limits the isolation, is not parallel to the axis of the isolator assembly 16 when it exits. Therefore, it can be virtually eliminated by collecting the optical output of the isolator assembly 16 using a lens with a small aperture and small acceptance angle. The aspheric lenses 20 and 22 provide such a small aperture (9 $\mu$m at the interface with the optical fibers 14 and 15) and a small acceptance angle needed for high isolation. Thus, when used on both sides of the isolator, these aspheric lenses set the collimated beam diameter through the isolator assembly 16 by expanding the beam from an input aperture of 9 $\mu$m diameter to about 1.5 mm in diameter. The isolator assembly 16 presents the collimated beam to a 9 $\mu$m aperture at the output of the aspheric lens 22 through a small acceptance angle for high isolation.

The transmission loss in dB of optical power at the receiving connetor is related to the offset angle of a light beam or ray by:

$$\mathrm{Loss}=20\log\left[e^{-(f\theta n\omega_o)^2}\right],$$

where $f$=the focal length of the lens=7 mm, $\theta$=the offset angle (radians), $n$=the index of refraction=1.4995, and $\omega_o=\frac{1}{2}$ the mode field diameter=0.00523 mm.

Figure 3:
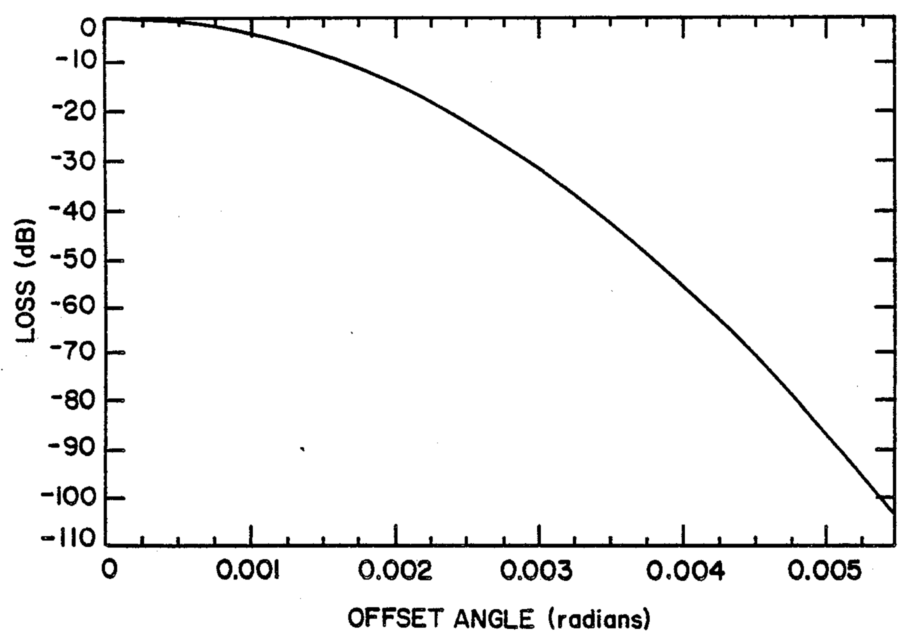
FIG. 3 is a graph of transmission loss between connectors as a function of offset angle.

A plot of transmission loss as a function of the offset angle is shown in FIG. 3. At an angle of 0.0045 radians the loss is 70 dB. This accounts for the extremely large rejection of scattered light coming out of the optical isolator.

A low-loss, high-isolation fiber-optic isolator assembled as described has been measured for loss and isolation and found to be 2.6 dB and greater than 70 dB, respectively. These results were achieved using commercially available components. The availability of such high quality single-mode fiber-optic isolators will make it possible to achieve substantial improvements in precision fiber-optic systems such as those used for stable reference frequency distribution and microwave frequency transmission.

Although particular embodiments of the invention have been described and illustrated herein, it is recognized that modifications and variations may readily occur to those skilled in the art. Consequently, it is intended that the claims be interpreted to cover such modifications and variations.

I claim:

1. A low-loss, high-isolation apparatus for isolating a source of an incident light beam transmitted through a first optical fiber a first portion of said beam of light reflected by a second optical fiber and scattered by an isolator assembly and for transmitting a second portion of said beam of light to said second optical fiber from said first optical fiber, comprising an isolator assembly comprised of a Faraday rotator with parallel planar surfaces on opposite sides and two polarizers with planar surfaces parallel to said planar surfaces of said rotators, said polarizers being oriented at an angle between their directions of polarization equal to the angle $\alpha$ of rotation of said Faraday rotator, and two aspheric lenses having their aspheric surfaces facing each other, and having said isolator assembly between them, and each having planar surfaces opposite said aspheric surfaces parallel to said planar surfaces of said rotator, each of said aspheric lenses having their axes angularly and laterally aligned, and having a narrow angle of acceptance of light, said narrow angle of acceptance being less than about 0.003 radians offset from the axes of said aspheric lenses for a loss of −30 dB, and less than about 0.0045 radians from their axes for a loss of −70 dB.

2. Apparatus as defined in claim 1 wherein said first optical fiber is a single-mode optical fiber connected to said planar surface of an aspheric lens on the input side of said assembly, and said second optical fiber is a single-mode optical fiber connected to said planar surface of an aspheric lens on the exit side of said assembly.

3. A low-loss, high-isolation apparatus of isolating a beam of light transmitted through a first optical fiber a first portion of said beam of light reflected by a second optical fiber and scattered in an isolator assembly and for transmitting a second portion of said beam of light to said second optical fiber, comprising an isolator assembly for coupling said first optical fiber to said second optical fiber, said isolator assembly having a Faraday rotator and two polarizers, said polarizers being oriented at an angle between their directions of polarization equal to an angle $\alpha$ of rotation of said Faraday rotator, and two aspheric lenses on opposite ends of said isolator assembly oriented with their aspheric surfaces facing each other and their axes substantially aligned angularly and laterally, each aspheric lens having a narrow angle of acceptance of light through said aspheric surface, said narrow angle of acceptance being less than about 0.0045 radians offset from the axis of said aspheric lens for a loss of −70 dB, each aspheric lens having a planar surface opposite said aspheric surface and perpendicular to the axis of said aspheric lens for interfacing with a separate one of said first and second optical fibers.

4. A low-loss, high-isolation apparatus as defined in claim 3 wherein said narrow angle of acceptance is about 0.003 radians offset from the axis of said aspheric lens for a loss of −30 dB.

5. A low-loss, high-isolation, fiber-optic coupler for isolating a beam of light transmitted through a first optical fiber to a second optical fiber from light reflected by said second optical fiber and scattered in said coupler comprising an optical isolator consisting of a Faraday rotator having parallel faces and two polarizers, one on each side of said Faraday rotator position between said first and second optical fibers, said polarizers having parallel interfaces with said parallel faces of said Faraday rotator, each of said polarizers further having an outer face parallel to its interface with said Faraday rotator, said two polarizers being oriented relative to each other at an angle between their directions of polarization equal to an angle $\alpha$ of rotation of said Faraday rotator, means for coupling light transmitted through said first optical fiber into said optical isolator comprising an aspheric lens having its axis aligned with the axis of said first optical fiber and normal to the outer face of the adjacent one of said two polarizers, said aspheric lens having a planar surface interfacing with an end face of said first optical fiber, and an aspheric surface facing the adjacent one of said polarizers, said aspheric surface being shaped to accept light from said adjacent polarizer and coupling light accepted into the end face of said first optical fiber within a limited angle from said axis, means for coupling light from said second optical fiber into said optical isolator comprising an aspheric lens having its axis aligned with the axis of said second optical fiber and normal to the outer face of the adjacent one of said two polarizers, said aspheric lens having a planar surface interfacing with an end face of said second optical fiber, and an aspheric surface facing the adjacent one of said two polarizers, said aspheric surface being shaped for acceptance of light from said adjacent polarizers and coupling light accepted into said second optical fiber within a limited angle from said axis.

* * * * *